United States Patent [19]
Yoon

[11] Patent Number: 5,321,456
[45] Date of Patent: Jun. 14, 1994

[54] DETACHABLE VIEW FINDER FOR VIDEO CAMERA

[75] Inventor: Dong-Seon Yoon, Seoul, Rep. of Korea

[73] Assignee: Daewoo Electronics Co., Ltd., Seoul, Rep. of Korea

[21] Appl. No.: 49,226

[22] Filed: Apr. 19, 1993

[30] Foreign Application Priority Data

Apr. 21, 1992 [KR] Rep. of Korea ............... 92-6697

[51] Int. Cl.[5] ............................................. G03B 13/02
[52] U.S. Cl. ................................. 354/219; 354/223; 352/171
[58] Field of Search ............... 354/219, 223; 352/171

[56] References Cited

U.S. PATENT DOCUMENTS

| | | | |
|---|---|---|---|
| 4,017,168 | 4/1977 | Brown | 352/171 |
| 4,541,698 | 9/1985 | Lerner | 354/219 |
| 4,672,436 | 6/1987 | Hawthorne | 354/219 |

*Primary Examiner*—Monroe H. Hayes
*Attorney, Agent, or Firm*—William F. Pinsak

[57] ABSTRACT

The present invention relates to a view finder for a video camera; and, more particularly, to a detachable view finder usable as a separate and independent unit from the main body of the video camera. The detachable view finder comprises means for detachably fixing the view finder to the main body, means for supporting the detached view finder in front of a user's eyes, and a cable for transmitting a video signal from the main body to the view finder, thereby allowing the operating of a stable posture regardless of a location of an object of shooting.

2 Claims, 2 Drawing Sheets

DETACHABLE VIEW FINDER FOR VIDEO CAMERA

FIELD OF THE INVENTION

The present invention relates to a view finder for a video camera; and, more particularly, to a detachable view finder usable as a separate and independent unit from the main body of the video camera.

DESCRIPTION OF THE PRIOR ART

A conventional video camera has a view finder fixed to a part of its main body, although the exact position where the view finder is installed may vary with the size and structure the video camera: e.g., the view finder of an 8 mm video camera is mounted on an upper surface of the main body, and the view finder of a large video camera (¾ inch type) is mounted on a sidewall of the main body.

In general, the user has to operate the video camera, supporting it on his shoulder by using his hands and seeing through the view finder closely. Accordingly, operation of such a video camera always requires a shooting posture which tends to tire the user easily.

An improved view finder for a video camera known in &he art, therefore, has been designed to be able to rotate within a predetermined angle to ease the problem; however, it still fails to remedy the difficulty in its entirety due to the limited access angle toward an object. In addition, since most video cameras are designed to use the right eye, it will further inconvenience the user who favors the use of his left eye in seeing through the view finder.

SUMMARY OF THE INVENTION

Accordingly, an object of the present invention is to provide a view finder for a video camera detachable from the main body thereof in order to enable the user to freely operate the camera with a stable posture, regardless of the location of the object being filmed.

Another object of the present invention is to provide a detachable view finder for a video camera which is freed from the access angle problem by way of eliminate the requirement that the camera and the user's face be close.

Still another object of the present invention is to provide a detachable view finder for a video camera capable of allowing the use of either the right or the left eye by separating the view finder from the main body.

The above and other objects of the present invention are accomplished by a detachable view finder for a video camera having a main body, which comprises: means for detachably fixing the view finder to the main body; means for supporting the view finder in front of a user's eyes when it is detached from the main body of the camera; and a cable for transmitting a video signal from the main body to the view finder.

BRIEF DESCRIPTION OF THE DRAWINGS

The above and other objects, advantages and features of the present invention will be apparent from the following descriptions, taken in conjunction with the accompanying drawings, wherein.

DETAILED DESCRIPTION OF THE PREFERRED EMBODIMENTS

Figure 1:
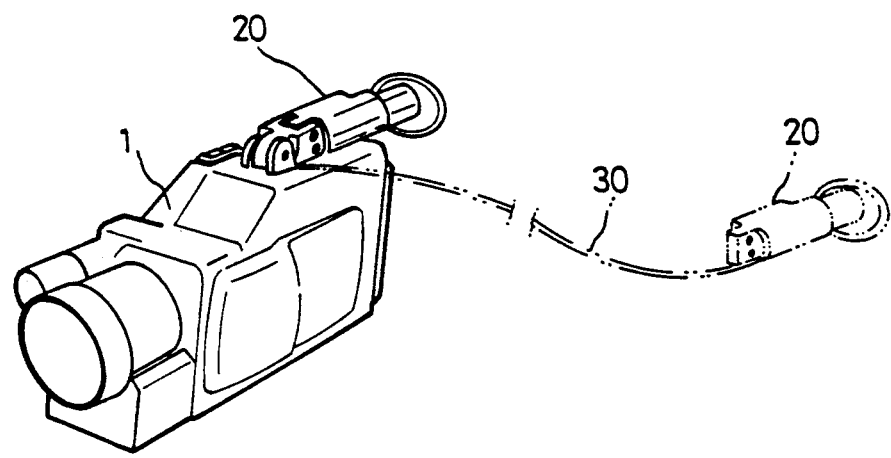
FIG. 1 is a perspective view of a video camera in accordance with the present invention.

Referring first to FIG. 1, there is shown a perspective view of a video camera of the present invention. As shown, a detachable view finder 20 having a display unit (not shown) therein is mounted on a portion of the main body 1 of the video camera. Illustrated in two dots and dashed lines is the view finder 20 detached from the main body, and the view finder is electrically connected to the main body via a cable 30.

Figure 2:
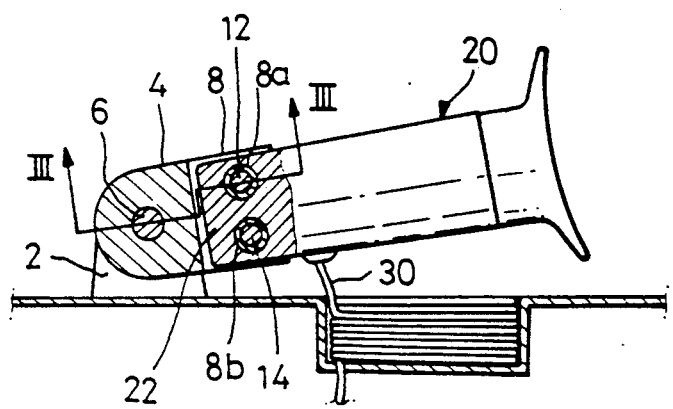
FIG. 2 is a section view of a detachable view finder in accordance with the present invention, partially broken away for illustrating a fixing means and a cable.
Figure 3:
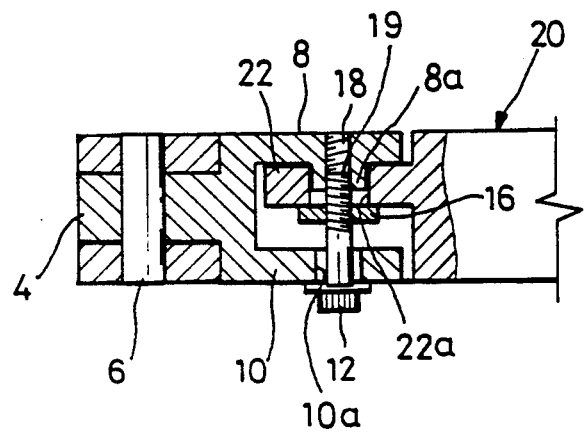
FIG. 3 is a cross-section taken along line III—III of FIG. 2.

FIGS. 2 and 3 are section views of a detachable view finder in accordance with the present invention, partially broken away for the purpose of illustrating the fixing means and the cable 30. As shown, the holder 4 is pivotally fixed to a bracket 2 mounted on the main body 1 to rotate within a predetermined angle about a hinge 6. The holder 4 has a pair of sidewalls 8 and 10, one of which is provided with a pair of boss members 8a and 8b having respective threads 18 therein, and the other of which is provided with a pair of throughholes 10a having a coaxial relation with the boss members 8a and 8b. An extension 22 stemming from one end of the view finder 20 is fixed to the bosses 8a and 8b of the holder 4 via a pair of holes 22a formed therein. A pair of screws 12 and 14 are inserted via the through-holes 10a of the sidewall 10 into the holes 22a of the extension 22, and, then, engaged with the threads 18 of the side wall 8. A pair of nuts 16 engaged with the screws 12 and 14 function to depressively fix the extension 22 of the view finder 20 against the sidewall 8 of the holder 4, thereby preventing the extension 22 from departing from the bosses 8a and 8b of the sidewall 8. The bosses 8a and 8b have such a height that, when the nut 16 makes contact with an inner surface of the sidewall 10, and a threaded end 19 of the screw 12 is approximately aligned with the nut 16, the extension 22 of the view finder 20 can be placed in position between the boss 8a and the nut 16 or the screw 12. The cable 30 for electrically connecting the main body 1 and the view finder 20 is wound in a known manner, e.g., as illustrated in FIG. 2.

Figures 4, 5:
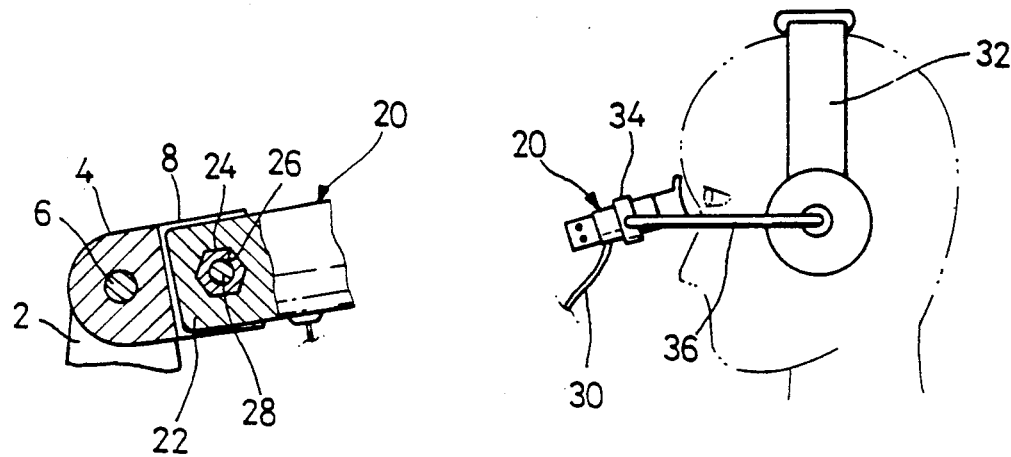
FIG. 4 is a section view of another embodiment of the detachable view finder.
FIG. 5 is a side view of a preferred embodiment of the supporting means for the view finder.

Referring to FIG. 4, there is shown a section view of another embodiment of the detachable view finder. As shown, the structure of the view finder in FIG. 4 is similar to that of FIG. 2 except that a hexagonal-shaped boss 24 and a corresponding hexagonal-shaped hole 26 replace the pair of bosses 8a and 8b and the pair of holes 16 of the extension.

FIG. 5 is a side view of a preferred embodiment of the supporting means for the view finder, with the user wearing the supporting means on his forehead. As shown, the supporting means comprises a headgear 32 which can be worn on the user's head, a gripper 34 for gripping the detached view finder 20, and a lever 36 for fixing the gripper 34 to the headgear 32. The lever 36 may preferably be fabricated to adjust the location of the view finder 20. In addition, if the view finder is miniaturized to a compact form by using a liquid crystal display (LCD) unit, such supporting means as a frame of spectacles may be employed.

While the present invention has been shown and described with reference to the particular embodiments, it will be apparent to those skilled in the art that many changes and modifications may be made without departing from the spirit and scope of the invention as defined in the appended claims.

What is claimed is:

1. A detachable view finder for a video camera having a main body, which comprises:

means for detachably fixing the view finder to the main body, which includes a bracket fixed to a portion of the main body, a holder pivotally mounted to the bracket and having one sidewall thereof provided with a pair of bosses and the outher sidewall provided with a pair of through-holes and facing said one sidewall, an extension integrally formed with one end of the view finder and having a pair of holes through which said pair of bosses are inserted, and attachment means for attaching the extension to the holder;

means for supporting the view finder in front of a user's eyes when it is detached from the main body of the camera, which includes a headgear, a gripper for gripping the detached view finder and a lever for fixing the gripper to the headgear; and a cable for transmitting a video signal from the main-body to the view finder.

2. The detachable view finder as claimed in claim 1 wherein said fixing means includes a bracket fixed to a portion of the main body, a holder pivotally mounted to the bracket and having one sidewall thereof provided with a polygonal-shaped boss and the other sidewall provided with a through-hole and facing said one sidewall, an extension integrally formed with on end of the view finder and having a polygonal-shaped hole through which said boss is inserted, and attachment means for attaching the extension to the holder.

* * * * *